United States Patent
Kajiwara et al.

(10) Patent No.: US 9,153,360 B2
(45) Date of Patent: Oct. 6, 2015

(54) WIRE HARNESS AND METHOD FOR PRODUCING WIRE HARNESS

(75) Inventors: Yasuhiro Kajiwara, Mie (JP); Takaaki Fukui, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 64 days.

(21) Appl. No.: 14/237,244

(22) PCT Filed: Apr. 17, 2012

(86) PCT No.: PCT/JP2012/060337
§ 371 (c)(1), (2), (4) Date: Feb. 5, 2014

(87) PCT Pub. No.: WO2013/057974
PCT Pub. Date: Apr. 25, 2013

(65) Prior Publication Data
US 2014/0291016 A1    Oct. 2, 2014

(30) Foreign Application Priority Data
Oct. 20, 2011 (JP) .................................. 2011-230581

(51) Int. Cl.
*H01B 9/00*    (2006.01)
*H01B 13/26*    (2006.01)
(Continued)

(52) U.S. Cl.
CPC .............. *H01B 9/00* (2013.01); *B60R 16/0215* (2013.01); *H01B 13/26* (2013.01); *H02G 3/0481* (2013.01)

(58) Field of Classification Search
CPC ...... H01B 9/00; H01B 13/26; B60R 16/0215; H02G 3/0481
USPC .......... 174/70 R, 72 A, 110 R, 122 R, 124 R; 156/56, 53, 52
See application file for complete search history.

(56) References Cited

U.S. PATENT DOCUMENTS 3,879,574 A * 4/1975 Filreis et al. .................... 174/76
4,511,611 A * 4/1985 Moisson ..................... 428/34.2
(Continued)

FOREIGN PATENT DOCUMENTS

| JP | 2007-030918 | 2/2007 |
| JP | 2011-160611 | 8/2011 |

(Continued)

OTHER PUBLICATIONS

International Search Report, mail date is May 29, 2012.

*Primary Examiner* — Hoa C Nguyen
*Assistant Examiner* — Amol Patel
(74) *Attorney, Agent, or Firm* — Greenblum & Bernstein, P.L.C.

(57) ABSTRACT

An object is to achieve excellent wear resistance in a case where a flexible portion is partially formed in a protection member formed by hot-pressing a nonwoven fabric. A wire harness has a wire harness main body including at least one electric wire and a protection member. The protection member includes a path regulating portion formed by hot-pressing a nonwoven member in a state of covering at least a portion of the wire harness main body, and a bendable portion formed by covering the wire harness main body with the nonwoven member, adjacent to the path regulating portion along an extending direction of the wire harness main body, the bendable portion being more readily bent than the path regulating portion and being more depressed than the path regulating portion.

6 Claims, 5 Drawing Sheets

(51) Int. Cl.
  *B60R 16/02* (2006.01)
  *H02G 3/04* (2006.01)

(56) References Cited

U.S. PATENT DOCUMENTS

| | | | | |
|---|---|---|---|---|
| 4,693,767 | A | * | 9/1987 | Grzanna et al. ................. 156/49 |
| 5,029,241 | A | * | 7/1991 | Robinson ........................ 174/92 |
| 6,302,980 | B1 | * | 10/2001 | Kortenbach et al. ............ 156/48 |
| 7,037,866 | B2 | * | 5/2006 | Michaud ....................... 442/408 |
| 7,754,301 | B2 | * | 7/2010 | Yamaguchi et al. ......... 428/34.9 |
| 2002/0098311 | A1 | * | 7/2002 | Lindner ....................... 428/40.1 |
| 2007/0166495 | A1 | * | 7/2007 | Sellis et al. ................. 428/36.1 |

FOREIGN PATENT DOCUMENTS

| | | |
|---|---|---|
| JP | 2011-171098 | 9/2011 |
| WO | 2011/096103 | 8/2011 |
| WO | 2011/102013 | 8/2011 |
| WO | WO 2011102013 A1 * | 8/2011 |

* cited by examiner

WIRE HARNESS AND METHOD FOR PRODUCING WIRE HARNESS

TECHNICAL FIELD

The present invention relates to a technology to protect a wire harness.

BACKGROUND ART

In a conventional technology, as disclosed in Patent Literature 1, a wire bundle is hot-pressed in a state of being covered by a nonwoven fabric to form a wire protection member. Patent Literature 1 discloses a technology to form into a path regulating portion and a bendable portion separately by differentiating a degree of compression, heating temperature, and the like.

CITATION LIST

Patent Literature

Patent Literature 1: Japanese Patent Laid-Open Publication No. 2011-160611

SUMMARY OF INVENTION

Technical Problem

In the technology disclosed in Patent Literature 1, however, the relatively soft bendable portion is exposed in a state of easily contacting an external peripheral member. Thus, the bendable portion is likely to be worn out.

The present invention is thus intended to provide excellent wear resistance when a readily bending portion is partially provided in a protection member formed by hot-pressing a nonwoven fabric.

Solution to Problem

In view of the circumstance above, a first aspect provides a wire harness including a wire harness main body including at least one electric wire and a protection member. The protection member includes a path regulating portion formed by hot-pressing a nonwoven member in a state of covering at least a portion of the wire harness main body, and a bendable portion formed by covering the wire harness main body with the nonwoven member, adjacent to the path regulating portion along an extending direction of the wire harness main body, the bendable portion being more readily bent than the path regulating portion and being more depressed than the path regulating portion. The protection member includes a portion where a first nonwoven member having a square sheet shape is wrapped around at least a portion of the wire harness main body, and a portion where a second nonwoven member having a strip shape is partially wound in the extending direction of the wire harness main body around the portion where the first nonwoven member is wrapped around. The path regulating portion is provided in a portion corresponding to the portion where the second nonwoven member is wound, and the bendable portion is provided in a portion corresponding to the portion where the second nonwoven member is not wound.

A second aspect provides the wire harness according to the first aspect, in which a surface of the bendable portion maintains an initial surface state without contacting a mold surface for hot-pressing.

A fourth aspect provides the wire harness according to the first or second aspect, in which a plurality of path regulating portions are provided and the bendable portion is provided between the pluralities of regulating portions.

Furthermore, in view of the circumstance above, a fifth aspect provides a method of producing a wire harness in which a wire harness main body including at least one electric wire is covered by a protection member in at least a portion. The method includes (a) a process of wrapping a first nonwoven member around at least a portion of the wire harness main body in an extending direction so as to have an even thickness; (b) a process of partially wrapping a second nonwoven member around the first nonwoven member in the extending direction, the first nonwoven member being wrapped around the wire harness main body; and (c) a process of hot-pressing in a state where a mold surface of a hot-pressing mold is not pressed against a surface of the first nonwoven member and is pressed against a surface of the second nonwoven member.

Furthermore, in the process (a), a square sheet-shaped nonwoven member serving as the first nonwoven member is wrapped around at least the portion of the wire harness main body; and, in the process (b), a strip-shaped nonwoven member serving as the second nonwoven member is wound around an outer periphery of the first nonwoven member wrapped around at least the portion of the wire harness main body.

A seventh aspect provides the method of producing a wire harness according to the fifth aspect, in which, in the process (b), the second nonwoven member is wrapped around the first nonwoven member in a plurality of locations at a distance in the extending direction, the first nonwoven member being wrapped around the wire harness main body.

Advantageous Effects of Invention

According to the wire harness of the first aspect, the path regulating portion regulates a path of the wire harness while the bendable portion allows the wire harness to bend partially with ease. Since the bendable portion is more depressed than the path regulating portion, an external peripheral member is unlikely to be in contact with the bendable portion, thus achieving good wear resistance.

According to the second aspect, the surface of the bendable portion maintains the initial surface state without contacting the mold surface for hot-pressing, thus allowing the bendable portion to bend more readily.

According to the first aspect, depending on the ways to wrap the square sheet-shaped first nonwoven member and the strip-shaped second nonwoven member, the path regulating portion and the bendable portion can be formed separately.

According to the fourth aspect, the wire harness can bend in the bendable portion between the path regulating portions.

According to the fifth aspect, the portion of the first nonwoven member wound around the wire harness main body where the second nonwoven member is wound is processed by the hot-pressing mold so as to be hardened sufficiently. This allows regulation of the path for the wire harness. In the portion of the first nonwoven member wound around the wire harness main body where the second nonwoven member is not wound, the first nonwoven member maintains flexibility, and thus the wire harness can be readily bent partially. Furthermore, since the latter portion is more depressed than the former portion, an external peripheral member is unlikely to be in contact with the latter portion, thus achieving good wear resistance.

According to the fifth aspect, the first nonwoven member can be readily wrapped in an even manner and the second nonwoven member can be readily wound in a small area.

According to the seventh aspect, the path can be regulated in a plurality of locations and the wire harness can be bent in flexible locations therebetween.

DESCRIPTION OF EMBODIMENTS

A wire harness 10 according to an embodiment and a method of producing the same are described below.

Figure 1:
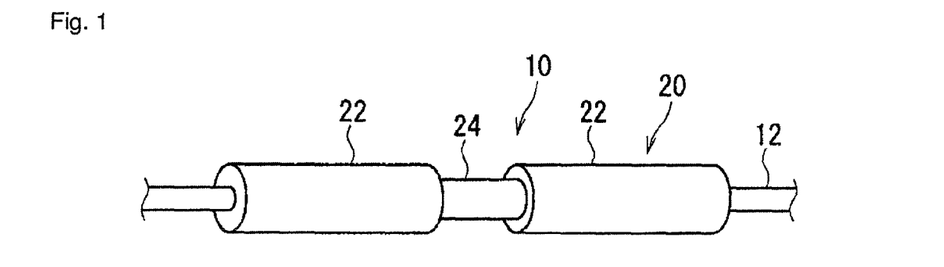
FIG. 1 A schematic perspective view of a wire harness according to an embodiment.
Figure 2:
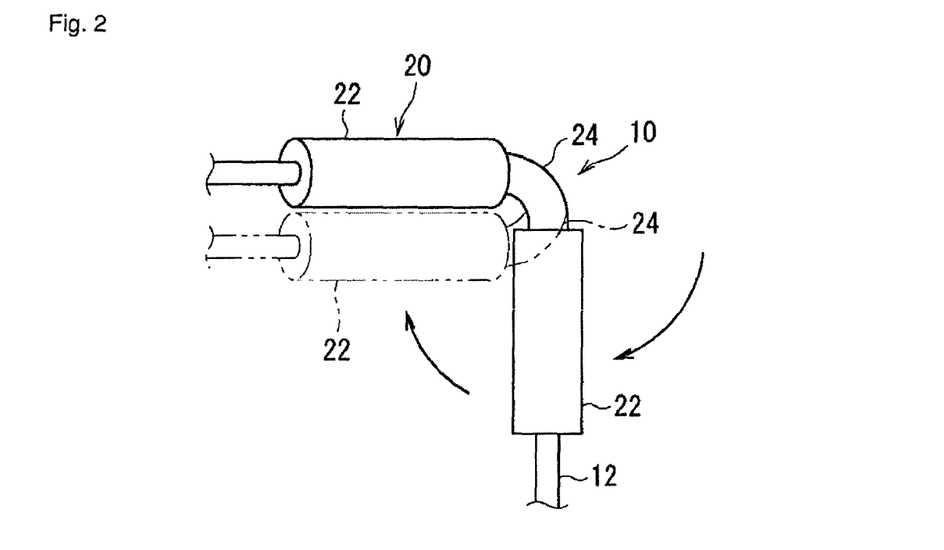
FIG. 2 A schematic perspective view of the wire harness in a bent state.

The wire harness 10 is first described. FIG. 1 is a schematic perspective view of the wire harness 10; FIG. 2 is a schematic perspective view of the wire harness 10 in a bent state.

The wire harness 10 has a wire harness main body 12 and a protection member 20.

The wire harness main body 12 includes at least one electric wire. The wire harness main body 12 herein includes a bundle of a plurality of electric wires. The electric wires are a wiring material that electrically connects various electric devices in a vehicle body and the like. The wire harness main body 12 may include an optical cable and the like.

The protection member 20 is formed by hot-pressing a nonwoven member (nonwoven fabric, for example) in a state where the nonwoven member covers at least a portion in a longitudinal direction of the wire harness main body 12. The protection member 20 may cover approximately the entire longitudinal direction of the wire harness main body 12, and may cover a portion of the wire harness main body 12.

The nonwoven member is a material that can be hardened in a heating process. Such a nonwoven member can include an elementary fiber and an adhesive resin (also referred to as a binder) interwoven therewith. The adhesive resin has a lower melting point (for example, 110° C. to 115° C.) than that of the elementary fiber. The nonwoven member is heated at a processing temperature lower than the melting point of the elementary fiber and higher than the melting point of the adhesive resin, and then the adhesive resin melts and seeps in between the elementary fibers. Thereafter, the temperature of the nonwoven member lowers below the melting point of the adhesive resin, and then the adhesive resin is solidified in a state where the elementary fibers are bound together. Thus, the nonwoven member becomes harder than in a pre-heating state and is maintained in a shape formed at the time of heating. The melted adhesive resin also seeps into and is solidified at portions where nonwoven members touch each other. Thereby, the touching portions of the nonwoven members are bonded.

Any fiber capable of maintaining a fibrous state at the melting point of the adhesive resin can be used as the elementary fiber. Other than a resin fiber, various kinds of fibers can be used. In addition, a thermoplastic resin fiber having a melting point lower than the melting point of the elementary fiber can be used as the adhesive resin. The adhesive resin may be granular or fibrous. Alternatively, a binder fiber may be provided by forming an adhesive resin layer around an outer periphery of a core fiber and be interwoven with the elementary fibers. The core fiber in this case can be the same material as the elementary fiber.

An exemplary combination of the elementary fiber and the adhesive resin may include a resin fiber composed of PET (polyethylene terephthalate) as the elementary fiber and a copolymer resin composed of PET and PEI (polyethylene isophthalate) as the adhesive resin. In this case, the melting point of the elementary fiber is approximately 250° C., while the melting point of the adhesive resin is 110° C. to 150° C. Thus, when the nonwoven member is heated at a temperature of 110° C. to 250° C., the adhesive resin melts and seeps in between the elementary fibers, which do not melt and hold a fibrous shape. When the temperature of the nonwoven member then lowers below the melting point of the adhesive resin, the adhesive resin is solidified in a state where the elementary fibers are bound together, and the nonwoven member is hardened and maintained in a shape formed at the time of heating.

The hot-pressing herein refers to a process in which the nonwoven member is heated and pressed against a mold to be formed into a predetermined shape. The heating process and the process of forming into the predetermined shape may be performed simultaneously, or may be performed separately and sequentially. For instance, the nonwoven member may be heated in a compressed state and then be pressed against a predetermined mold for bending before being cooled and solidified. Thus, the bent shape can be maintained. An example of the hot-pressing suitable for production of the protection member 20 according to the present embodiment will be described later in detail.

The protection member 20 has a path regulating portion 22 and a bendable portion 24.

The path regulating portion 22 is formed by hot-pressing a nonwoven member that covers the wire harness main body 12. The path regulating portion 22 is compressed and hardened sufficiently by hot-pressing so as to have a level of shape maintaining capability that allows a path to be maintained for the wire harness main body 12. The path regulating portion 22 may have a shape (may be linear or curved) in accordance with a wiring path of the wire harness main body 12 in a vehicle or the like, and thus the wire harness main body 12 is regulated to the shape. A plurality of (two herein) path regulating portions 22 are provided at a distance therebetween. The path regulating portion 22 has a circular shape in cross section herein, but may have an elliptical shape, a polygonal shape, or another shape in cross section.

The bendable portion 24 is formed of the nonwoven member that covers the wire harness main body 12, adjacent to the path regulating portion 22 along an extending direction of the wire harness main body 12. The bendable portion 24 herein is provided between the plurality of (two herein) path regulating portions 22. The bendable portion 24 is more readily bent than the path regulating portion 22. To make the bendable portion 24 more readily bent than the path regulating portion 22, the bendable portion 24 is preferably neither brought into contact with a hot-pressing mold nor hot-pressed. In other words, a surface of the bendable portion 24 preferably maintains an initial surface state without contacting a hot-pressing mold surface. Of course, the bendable portion 24 may be brought into contact with a hot-pressing mold for hot-pressing to the extent that the bending portion 24 is more readily bent than the path regulating portion 22. The bendable portion 24 is more depressed than the path regulating portion 22. Specifically, the bendable portion 24 is more depressed in a circumferential direction thereof than the path regulating portion 22.

A specific exemplary configuration to form into the path regulating portion 22 and the bendable portion 24 separately will be described later, together with an exemplary production method.

According to the wire harness 10 configured as above, the path regulating portion 22 can regulate a path of the wire harness 10. In addition, the bendable portion 24 allows the wire harness 10 to bend partially as shown in FIG. 2. Thus, for transportation of the wire harness 10, for example, the wire harness 10 can be folded in two at the bendable portion 24 to shorten the entire length and, in this state, the wire harness 10 can be efficiently stored in a container box and the like for transportation, thus allowing transportation to be carried out efficiently. Furthermore, for assembly of the wire harness 10 in a vehicle or the like, the wire harness 10 can be assembled as being bent at the bendable portion 24. In particular, to assemble the wire harness 10 in a vehicle or the like by passing through a narrow gap therein, the wire harness 10 can be bent in the bendable portion 24 so as to be in a compact form for passing through the narrow gap, thus facilitating assembly of a vehicle or the like. When the wire harness 10 is actually assembled in a vehicle or the like, the wire harness 10 is flexibly deformed at the bendable portion 24 according to an actual wiring path in the vehicle or the like, thus facilitating assembly work.

Due to a lower degree of compression and heating compared to the path regulating portion 22, the bendable portion 24 is more flexible and thus may have lower wear resistance. The bendable portion 24 is therefore depressed more than the path regulating portion 22. Thus, a peripheral member is unlikely to be in contact with the bendable portion 24 during transportation, in a state of assembly, and the like, of the wire harness 10. Accordingly, the protection member 20 has good wear resistance as a whole. In particular, when the bendable portion 24 is bent only during transportation and is straightened in a state of assembly to a vehicle, a peripheral member is unlikely to be in contact with the bendable portion 24.

An exemplary method of producing the protection member 20 by hot-pressing is described.

Figure 3:
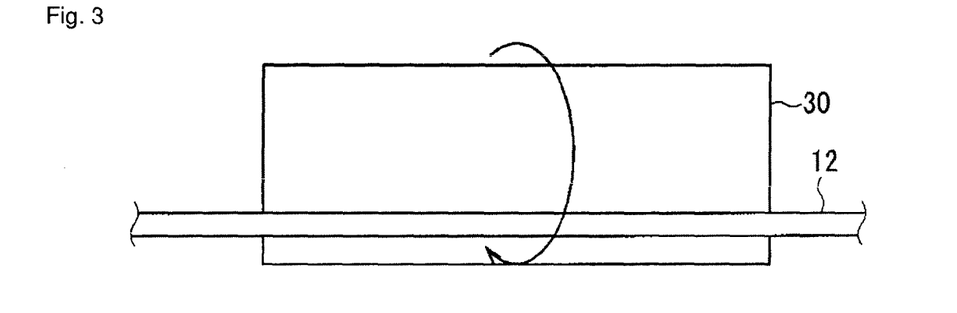
FIG. 3 A view illustrating a production process of a wire harness.
Figure 4:
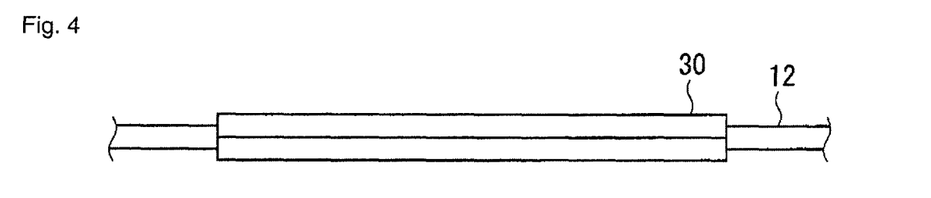
FIG. 4 A view illustrating a production process of the wire harness.

With respect to FIGS. 3 and 4, a first nonwoven member 30 is first wrapped around at least a portion of the wire harness main body 12 so as to be even in thickness in the extending direction thereof (thickness in a diameter direction of a tubular form in a wrapped state). The thickness of the first nonwoven member 30 in the wrapped state may vary to some degree in the extending direction of the wire harness main body 12, depending on flexibility of the first nonwoven member 30 or a variation in a degree of overlap of the first nonwoven member 30 due to a wrapping method.

In the present example, a square sheet-shaped nonwoven fabric is used as the first nonwoven member 30, which is wrapped around the wire harness main body 12 at least one time. Thus, the first nonwoven member 30 can be wrapped in a state as even as possible over a relatively wide range. The first nonwoven member 30 is preferably wrapped one to one and half times. Of course, a strip-shaped nonwoven fabric may be used as the first nonwoven member 30, which is spirally wound around the wire harness main body 12.

In order to prevent a surface of the first nonwoven member 30 from contacting a mold surface of a hot-pressing mold in a hot-pressing process (described later), a cross-sectional outer shape of the wrapped first nonwoven member 30 is preferably formed smaller than a cross-sectional shape of a space for hot-pressing defined by a lower mold surface 63 and an upper mold surface 72 (described later).

Figure 5:
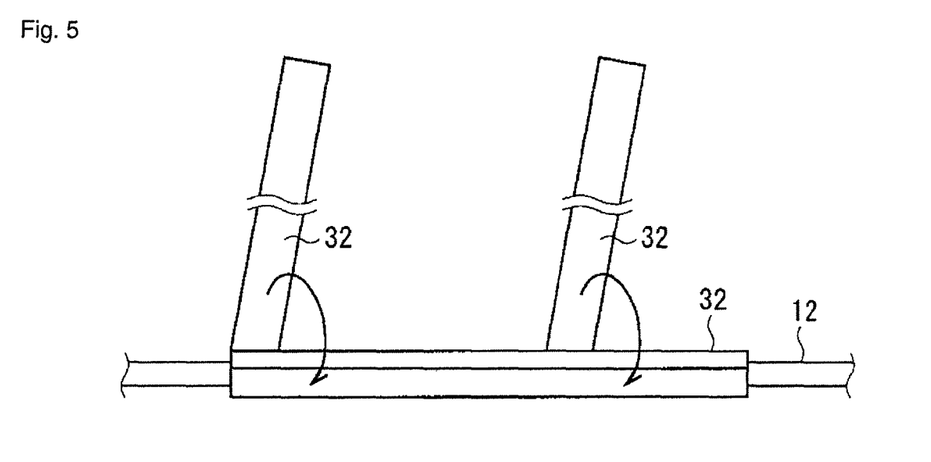
FIG. 5 A view illustrating a production process of the wire harness.
Figure 6:
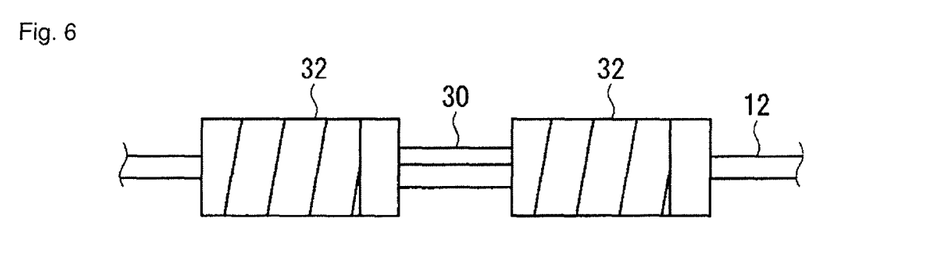
FIG. 6 A view illustrating a production process of the wire harness.

Then, with reference to FIGS. 5 and 6, a second nonwoven member 32 is partially wrapped around an outer periphery of the first nonwoven member 30 in the extending direction, the first nonwoven member 30 being wrapped around the wire harness main body 12. Specifically, the second nonwoven member 32 is wrapped around a portion corresponding to the path restricting portion 22.

In the present example, a strip-shaped nonwoven fabric is spirally wound as the second nonwoven member 32. With the strip-shaped nonwoven fabric used as the second nonwoven member 32, the second nonwoven member 32 is readily wound in a small area. The second nonwoven member 32 is preferably wound approximately once around the outer periphery of the first nonwoven member 30.

In other words, in the bendable portion 24, the first nonwoven member 30 as a nonwoven member is preferably wrapped approximately one to one and half times; and, in the path regulating portion 22, the first nonwoven member 30 and the second nonwoven member 32 as nonwoven members are preferably wrapped approximately two to two and half times.

Of course, a square sheet-shaped nonwoven fabric may be used as the second nonwoven member 32, which is spirally wound around the outer periphery of the first nonwoven member 30.

In the present example, since a plurality of path regulating portions 22 are provided as described above, the second nonwoven member 32 is wound in a plurality of locations (two locations) with a distance in the outer periphery of the first nonwoven member 30.

Figure 7:
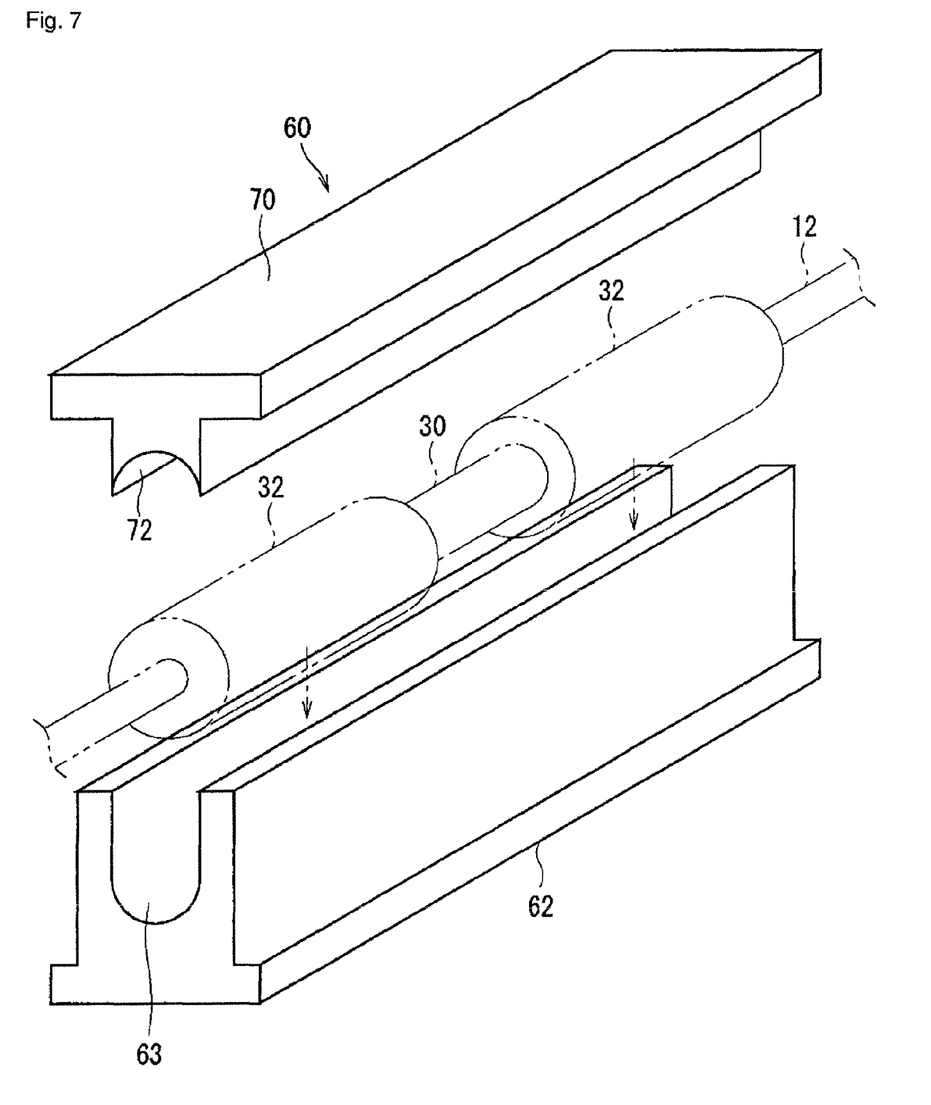
FIG. 7 A view illustrating a production process of the wire harness.
Figure 8:
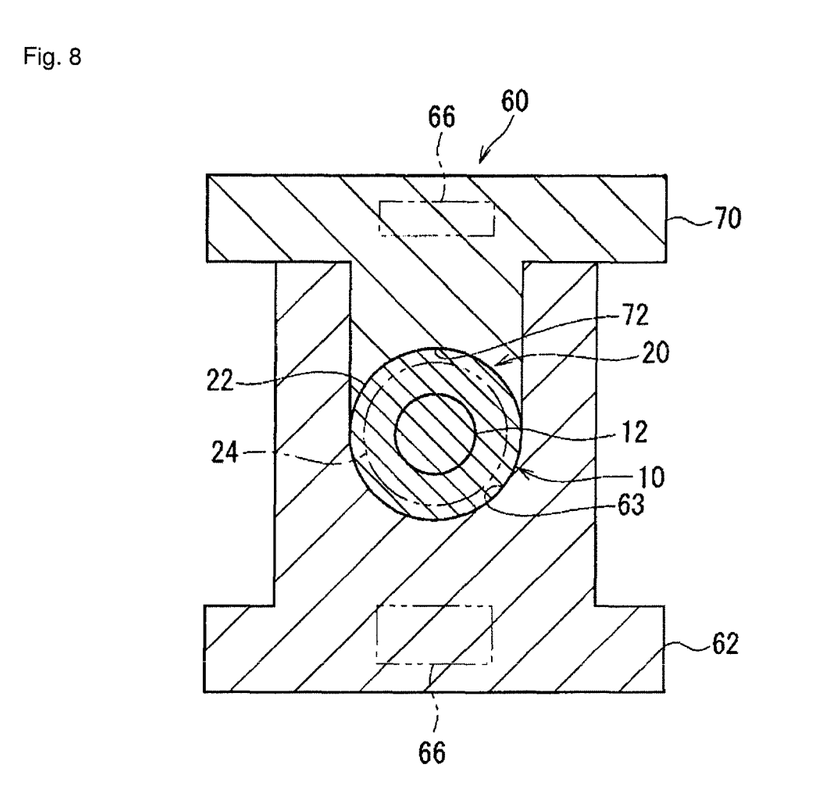
FIG. 8 A view illustrating a production process of the wire harness.
Figure 9:
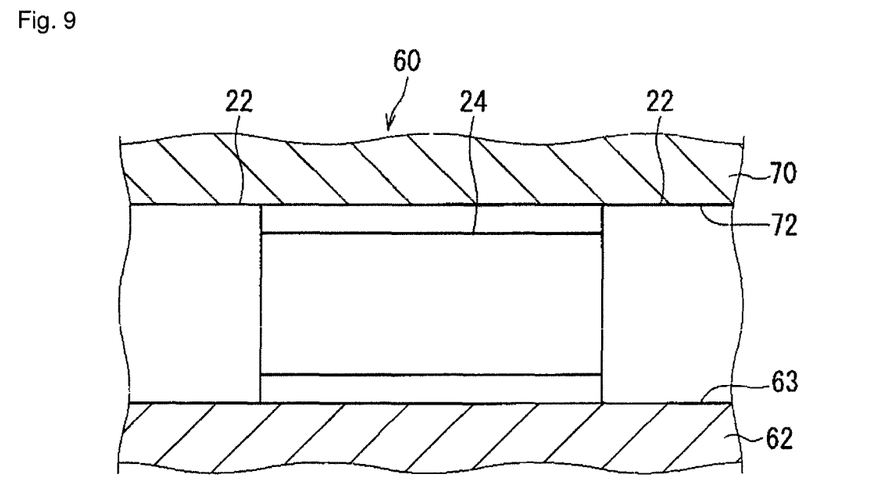
FIG. 9 A view illustrating a production process of the wire harness.

Subsequently, hot-pressing is performed. A configuration example of a hot-pressing mold is described below. FIG. 7 illustrates a hot-pressing mold 60; FIG. 8 is a schematic cross-sectional view of the hot-pressing mold 60 during hot-pressing; and FIG. 9 is a schematic cross-sectional view of a portion of the hot-pressing mold 60 during hot-pressing.

The hot-pressing mold 60 has a lower mold 62 and an upper mold 70.

The lower mold 62, which is an elongated member formed of metal or the like having excellent thermal conductivity, has a lower mold surface 63 on one main surface (upper surface) thereof. The lower mold surface 63 is formed into substantially a groove shape having a semi-tubular bottom surface and open upward. A longitudinal length of the lower mold surface 63 is substantially the same as a length of a protected portion (portion to be covered by the protection member 20) of the wire harness main body 12. The lower mold surface 63 has a shape extending according to a path when the protected portion of the wire harness main body 12 is provided in a vehicle body (linear shape in FIG. 7; may be curved).

The upper mold 70, which is an elongated member formed of metal or the like having excellent thermal conductivity, has an upper mold surface 72 on one main surface (lower surface) thereof. The upper mold surface 72 is formed into a groove shape having a semi-tubular upper surface and open downward. The upper mold surface 72 has a width capable of closing the upper opening of the lower mold surface 63 and being placed in the lower mold surface 63. The upper mold surface 72 has a shape extending according to a bending shape of the lower mold surface 63 along the path.

The upper mold surface 72 is placed in the lower mold surface 63, and then a space is defined between the upper mold surface 72 and the lower mold surface 63 to enable the protection member 20 to be formed. A heating portion 66, such as a heater or the like, is provided to the lower mold 62 and upper mold 70.

A hot-pressing method using the hot-pressing mold 60 is described.

Specifically, the portion of the wire harness main body 12 where the first nonwoven member 30 and the second nonwoven member 32 are wrapped are pressed into the lower mold surface 63.

Thereafter, the upper mold surface 72 of the upper mold 70 is inserted into the lower mold surface 63, and, in this state, hot-pressing is performed in the hot-pressing mold 60. In this state, the lower mold surface 63 and the upper mold surface 72 are pressed against an outer periphery of the second nonwoven member 32, but are not pressed against an outer periphery of a portion of the first nonwoven member 30 where the second nonwoven member 32 is not wound (refer to FIG. 9). In other words, the second nonwoven member 32 is compressed, while the portion of the first nonwoven member 30 where the second nonwoven member 32 is not wound is not compressed. In the state above, the lower mold 62 and the upper mold 70 are heated for hot-pressing, and then the second nonwoven member 32 portion is heated in a compressed state. The portion of the first nonwoven member 30 where the second nonwoven member 32 is not wound is not compressed, and heating is prevented from reaching a high temperature. In this state, an adhesive resin is not preferably melt in the portion of the first nonwoven member 30 where the second nonwoven member 32 is not wound. To the extent, however, that the portion is eventually more readily bent than the path restricting portion 22, the adhesive resin may melt to some degrees.

The first nonwoven member 30 and the second nonwoven member 32 are cooled thereafter. In the portion where the second nonwoven member 32 is wound, a surface thereof is then hardened in a shape defined by the lower mold surface 63 and the upper mold surface 72, and thus the path regulating portion 22 is formed. Furthermore, in the portion where the second nonwoven member 32 is wound, the nonwoven members are bonded in a touch portion, and thus a state of covering the wire harness main body 12 is maintained. In the portion of the first nonwoven member 30 where the second nonwoven member 32 is not wound, the second nonwoven member 32 maintains good bendability possessed in an initial state, and thus the bendable portion 24 is provided.

According to the method of production, the portion of the first nonwoven member 30 wound around the wire harness main body 12 where the second nonwoven member 32 is wound is processed by the hot-pressing mold 60 so as to be hardened sufficiently. This allows regulation of a path for the wire harness 10. In the portion of the first nonwoven member 30 wound around the wire harness main body 12 where the second nonwoven member 32 is not wound, the first nonwoven member 30 maintains flexibility, and thus the wire harness 10 can be readily bent partially. Thereby, the wire harness 10 can be formed with ease.

Figure 10:
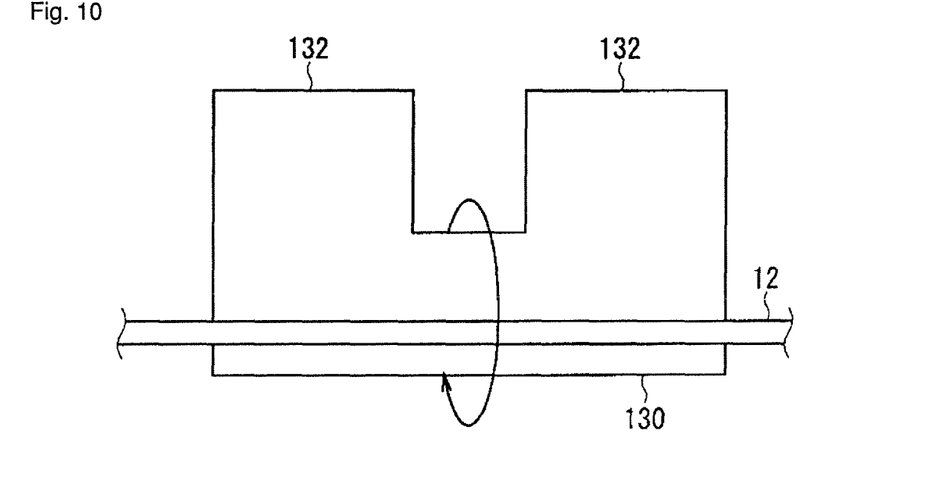
FIG. 10 A view illustrating a production process of a wire harness according to a modified example.

In the example of the embodiment above, the first nonwoven member 30 and the second nonwoven member 32 are separate. As in a modified example shown in FIG. 10, however, a combined form may be used in which a second nonwoven member 132, which corresponds to the second nonwoven member 32, extends from a first side edge portion of a first nonwoven member 130, which corresponds to the first nonwoven member 30. In the modified example, the second nonwoven members 132 extend from two end portions of the first side edge portion of the first nonwoven member 130 at a distance therebetween.

Figure 11:
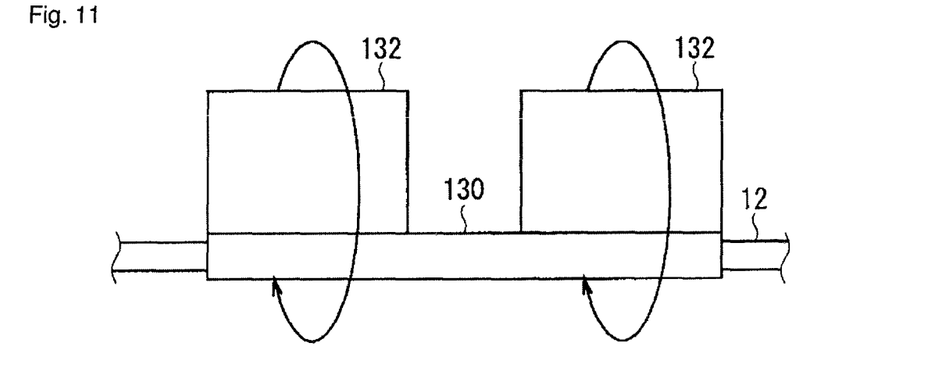
FIG. 11 A view illustrating a production process of the wire harness according to the modified example.

Then, the wire harness main body 12 is placed along a second side edge portion of the first nonwoven member 130, and, as shown in FIG. 11, the first nonwoven member 130 is wrapped around the wire harness main body 12. Subsequently, with reference to FIG. 12, the second nonwoven members 132 are wrapped around an outer periphery of the first nonwoven member 130 which has been wrapped around.

Figure 12:
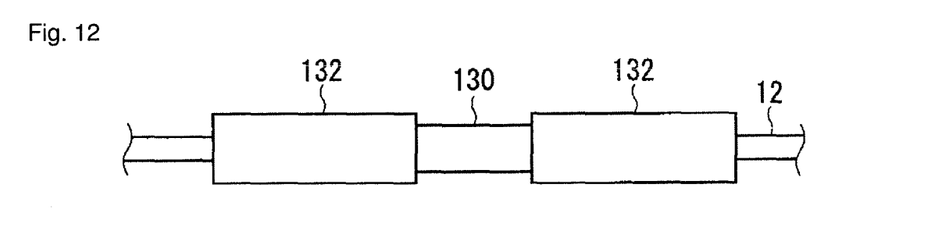
FIG. 12 A view illustrating a production process of the wire harness according to the modified example.

Thereafter, similar to the embodiment above, portions where the second nonwoven members 132 are wrapped are hot-pressed using the hot-pressing mold 60, and then a wire harness similar to that in the embodiment above is produced. In particular, according to the present modified example, one nonwoven sheet is used for production. This reduces the kind and number of components and facilitates production. Another advantage is that the portions where the second nonwoven members 132 are wrapped are readily aligned.

The detailed description above of the present invention is presented merely as an example in all aspects and should not limit the present invention. Innumerable modified examples not presented are construed to be assumed without deviating from the scope of the present invention.

The invention claimed is:

1. A wire harness comprising:
   a wire harness main body including at least one electric wire; and
   a protection member comprising:
      a path regulating portion formed by hot-pressing a nonwoven member covering at least a portion of the wire harness main body; and
      a bendable portion formed by covering the wire harness main body with the nonwoven member, adjacent to the path regulating portion along an extending direction of the wire harness main body, the bendable portion configured to be more readily bent than the path regulating portion and more depressed than the path regulating portion, wherein
   the protection member comprises:
      a portion where a first nonwoven member having a square sheet shape is wrapped around at least a portion of the wire harness main body; and
      a portion where a second nonwoven member having a strip shape is partially wound in the extending direction of the wire harness main body around the portion where the first nonwoven member is wrapped around, and
   the path regulating portion is provided in a portion corresponding to the portion where the second nonwoven member is wound and the bendable portion is provided in a portion corresponding to the portion where the second nonwoven member is not wound.

2. The wire harness according to claim 1, wherein a surface of the bendable portion maintains an initial surface condition without contacting a mold surface for hot-pressing.

3. The wire harness according to claim 2, wherein a plurality of path regulating portions are provided and the bendable portion is provided between the pluralities of path regulating portions.

4. The wire harness according to claim 1, wherein a plurality of path regulating portions are provided and the bendable portion is provided between the pluralities of path regulating portions.

5. A method of producing a wire harness in which a wire harness main body including at least one electric wire is covered by a protection member in at least a portion, the method comprising:
   wrapping a first nonwoven member which is square sheet-shaped around at least a portion of the wire harness main body in an extending direction so as to have an even thickness;
   partially wrapping a second nonwoven member which is strip-shaped around an outer periphery the first nonwoven member in the extending direction, the first nonwoven member being wrapped around the wire harness main body; and
   hot-pressing in which a mold surface of a hot-pressing mold is not pressed against a surface of the first nonwoven member and is pressed against a surface of the second nonwoven member.

6. The method of producing a wire harness according to claim 5, wherein the second nonwoven member is wrapped around the first nonwoven member in a plurality of locations at a distance in the extending direction.

\* \* \* \* \*